US009304576B2

United States Patent
Jackson et al.

(10) Patent No.: US 9,304,576 B2
(45) Date of Patent: Apr. 5, 2016

(54) POWER MANAGEMENT FOR A WEARABLE APPARATUS

(71) Applicants: Bradley A. Jackson, Hillsboro, OR (US); Francisco J. Fernandez, Portland, OR (US); Cory J. Booth, Beaverton, OR (US); Glen J. Anderson, Beaverton, OR (US); Deepak S. Vembar, Portland, OR (US); Giuseppe Raffa, Portland, OR (US)

(72) Inventors: Bradley A. Jackson, Hillsboro, OR (US); Francisco J. Fernandez, Portland, OR (US); Cory J. Booth, Beaverton, OR (US); Glen J. Anderson, Beaverton, OR (US); Deepak S. Vembar, Portland, OR (US); Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 81 days.

(21) Appl. No.: 14/224,111

(22) Filed: Mar. 25, 2014

(65) Prior Publication Data

US 2015/0277540 A1 Oct. 1, 2015

(51) Int. Cl.
*G06F 1/32* (2006.01)
*G06F 3/01* (2006.01)
*G06F 3/0346* (2013.01)
*G06F 3/041* (2006.01)
*G06F 17/30* (2006.01)

(52) U.S. Cl.
CPC .............. *G06F 1/3265* (2013.01); *G06F 3/011* (2013.01); *G06F 3/017* (2013.01); *G06F 3/0346* (2013.01); *G06F 3/0412* (2013.01); *G06F 17/30557* (2013.01); *G06F 2203/04101* (2013.01); *G06F 2203/04104* (2013.01); *G06F 2203/04808* (2013.01)

(58) Field of Classification Search
CPC ..................................................... G06F 1/3265
See application file for complete search history.

(56) References Cited

U.S. PATENT DOCUMENTS

| 2001/0012240 A1* | 8/2001 | Terzian | 368/82 |
| 2012/0059780 A1* | 3/2012 | Kononen et al. | 706/14 |
| 2012/0083705 A1* | 4/2012 | Yuen et al. | 600/508 |

OTHER PUBLICATIONS

Raffa, et al., "Sensors-Based Automatic Reconfiguration of Multiple Screens in Wearable Devices and Flexible Displays", PCT Patent Application No. PCT/US2013/077761, filed on Dec. 26, 2013, 28 pages.

\* cited by examiner

*Primary Examiner* — Gerald Johnson
(74) *Attorney, Agent, or Firm* — Jordan IP Law, LLC (57) ABSTRACT

Apparatus, systems, and/or methods may provide power management. An attachment portion may secure an apparatus to a user. In one example, an apparatus includes a wearable wristwatch having a wristband attachment portion. A context corresponding to a user state may be determined from context data such as, for example, sensor context data, database context data, companion context data, and/or user context data. The context may be used to specify a power mode applicable to a part of the apparatus to manage power.

24 Claims, 5 Drawing Sheets

POWER MANAGEMENT FOR A WEARABLE APPARATUS

BACKGROUND

Embodiments generally relate to power management for a wearable apparatus. More particularly, embodiments relate to determining a context corresponding to a user state and specifying a power mode applicable to a part of the wearable apparatus based on the context.

A conventional power management architecture may utilize a basic rule set to implement a power mode, such as entering an apparatus into a sleep mode after a passage of a predefined time of inactivity. Such basic rule sets, however, may lead to relatively inefficient power management and/or relative inconvenience to a user. In addition, the conventional power management architecture may not account for another platform associated with the apparatus, which may lead to relatively inefficient power management of the apparatus and/or of the associated platform.

BRIEF DESCRIPTION OF THE DRAWINGS

The various advantages of embodiments will become apparent to one skilled in the art by reading the following specification and appended claims, and by referencing the following drawings, in which:

DETAILED DESCRIPTION

Figure 1:
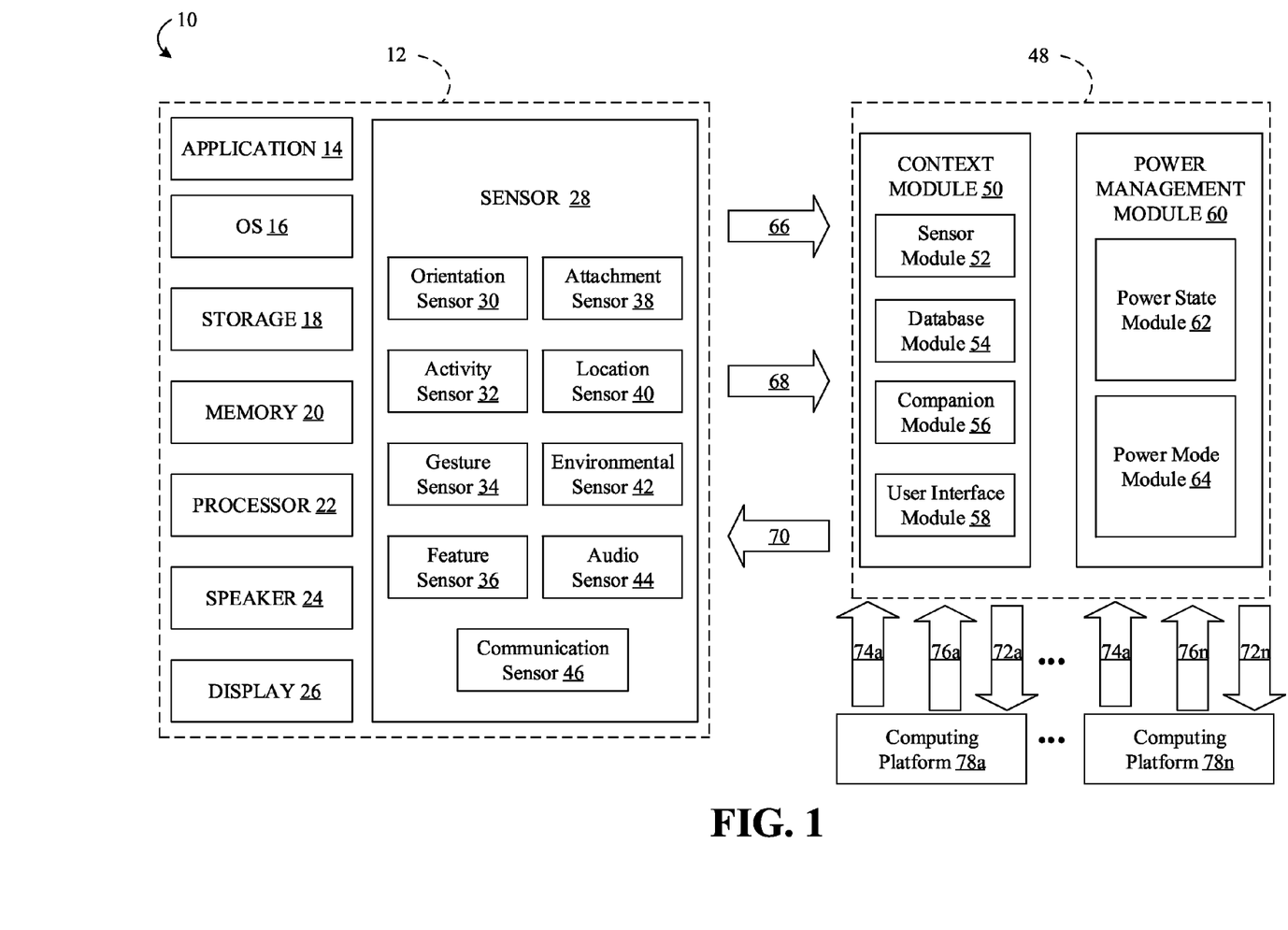
FIG. 1 is a block diagram of an example architecture to manage power according to an embodiment.

FIG. 1 shows an example architecture 10 to manage power according to an embodiment. The illustrated architecture 10 includes an apparatus 12 such as, for example, a laptop, personal digital assistant (PDA), wireless smart phone, media player, imaging device, mobile Internet device (MID), any smart device such as a smart phone, smart tablet, smart TV, computer server, a wearable apparatus, and so on, or combinations thereof. In one example, the wearable apparatus may include apparel such as a jacket, a sweater, a blouse, a shirt, a pant, a skirt, a sock, and so on, or combinations thereof. In addition, the wearable apparatus may include an accessory such as a hat, a scarf, a tie, a glove, and so on, or combinations thereof. Moreover, the wearable apparatus may include footwear such as a shoe, a slipper, a boot, and so on, or combinations thereof. The wearable apparatus may also include an ornament such as a pendant (e.g., earring, main piece suspended from a necklace, etc.), a broach, a wristwatch, an armband, a headband, jewelry, and so on, or combinations thereof.

The apparatus 12 may be attached to a user via an attachment portion such as, for example, a shoulder, a collar, a button, a clip, fabric (e.g., fabric hood and loop fastener, thread, etc.), an adhesive, a band, a chain, a surface (e.g., a surface of a ring, etc.), and so on, or combinations thereof. In one example, a scarf including an electronic component (e.g., a display, a processor, etc.) may be relatively loosely secured to the user by a part of the scarf that is overlaid on the user as an attachment portion. In another example, a wearable wristwatch including an electronic component (e.g., a display, a processor, etc.) may be relatively tightly secured to the user by a wristband as an attachment portion. Thus, the attachment portion may be integral with the apparatus 12, such as a shoulder of a sweater, may be releasably coupled with the apparatus 12, such as a removable strap of a bag, and so on, or combinations thereof.

The illustrated apparatus 12 includes one or more components that utilize power such as an application 14, an operating system (OS) 16, storage 18, memory 20, a processor 22, a speaker 24, a display 26, a sensor 28, and so on, or combinations thereof. For example, the display 26 may include a touch screen display, a rotating display, a two-dimensional (2D) display, a three-dimensional (3D) display, an liquid crystal display (LCD), a light emitting diode (LED) display, a continuous display, a discrete display, a curved display, a plurality of opposing displays, and so on, or combinations thereof. In one example, the display 26 may include multiple discrete segments, a single continuous segment with multiple virtual displays, and so on, or combinations thereof.

The components of the apparatus 12 may constantly and/or dynamically consume power. For example, the sensor 28 may include a component that is always active, that becomes active when used, that becomes active at periodic intervals (e.g. programmable intervals, random intervals, etc.), and so on, or combinations thereof. In one example, a light sensor used to determine whether the apparatus 12 is attached to a user may always be active, may become active when movement associated with the apparatus 12 is detected, may become active at periodic intervals to sample sensor data, and so on, or combinations thereof. As described below, the sensor 28 may be controlled based on context data.

The sensor 28 may be coupled with a sensor hub to pre-process collected sensor data, wherein the sensor hub (e.g., mini sensor hub, etc.) imparts intelligence to the sensor 28 by making one or more determinations. The sensor 28 may also include a capability (e.g., circuitry, processor, software, etc.) to make the determinations (e.g., an intelligent sensor). For example, the sensor 28 may include a capability to pre-process collected sensor data and determine whether the sensor data is noise or is legitimate sensor data (e.g., based on a threshold value, etc.). Thus, the sensor 28 may determine that a motion does not signify a gesture (e.g., flipping a wrist, a hand, etc.) or a user activity (e.g., walking, running, placing a hand on a desk, viewing a display, etc.), but rather is noise (e.g., a tremble, etc.) and refrains from forwarding a wake up signal to, for example, the processor 22 of the apparatus 12 to process the legitimate sensor data. In addition, the sensor 28 may include a component to process the legitimate sensor data (e.g., to determine context), to specify a power mode in response to processing the legitimate sensor data, and/or to implement the power mode, etc., described below.

The sensor 28 may include a component to collect a specific data type. The illustrated sensor 28 includes an orientation sensor 30 such as a gyroscope to collect orientation data that may be used to determine a direction corresponding a component of the apparatus 12 and/or a part of the user (e.g., an appendage, etc.). For example, data from the gyroscope may be used to determine context including that the apparatus 12 and or a part of the user (e.g., wrist, palm, etc.) points in a particular direction (e.g., north, up, down, tilt, etc.). The sensor 28 also includes an activity sensor 32 to collect activity data. The activity sensor 32 may include a gyroscope, an accelerometer, a microphone (e.g., for breath, background audio, etc.), and so on, or combinations thereof, wherein the activity data may be used to determine an activity corresponding to a user travel motion and/or an apparatus travel motion. In one example, data from the accelerometer may be used to determine that the context includes an exercise activity corresponding to walking, running, and so on, or combinations thereof. In another example, data from the microphone may be used to identify a pulse value and/or a heart rate value and determine that the context includes user sleep activity, exercise activity, meeting activity, and so on.

The sensor 28 includes a gesture sensor 34 to collect gesture data. The gesture sensor 34 may include a gyroscope, an accelerometer, a microphone (e.g., breath, background noise, etc.), a camera, an infrared (IR) sensor, and so on, or combinations thereof, wherein the gesture data may be used to determine an activity corresponding to a user expression and/or a gesture made. In one example, data from the gyroscope and the accelerometer may be used to determine that the context includes the user has flipped a wrist (e.g., clockwise, counterclockwise, etc.) which a wristwatch is attached. In another example, data from the microphone may be used to determine that the context includes the user has input a user speech command. In a further example, data from the camera may be used to determine that the context includes the user is happy.

The sensor 28 may include a feature sensor 36 to collect feature data. The feature sensor 36 may include a microphone, a camera, a touch screen, and so on, or combinations thereof. In one example, data from the microphone may be used to determine that the context includes the user is excited (e.g., from a user voice tone, pitch, etc.) while the data from the camera may be used to determine that the context includes the user enjoying shade in a park (e.g., from a landscape feature such as a road, a store, a table, a wall, etc., from a user feature such as a user face, a part of a face, a distance to the face, an appendage, clothing, etc.). In another example, data from the touch screen may be used to determine that the context includes an authorized and/or unauthorized user is using the apparatus 12 (e.g., from a print such as a fingerprint, a palm print, etc.).

The sensor 28 may include an attachment sensor 38 to collect attachment data. The attachment sensor 38 may include a camera, an IR sensor, a microphone, and so on, or combinations thereof. In one example, data from the camera and/or the IR sensor may be used to determine that the context includes that the user is wearing the apparatus 12 (e.g., from an intensity value, an image, etc.). In another example, data from the microphone may be used to determine that the context includes the user is wearing the apparatus 12 (e.g., from a pulse value, a heart rate value, etc.). In a further example, the data from the microphone may be used to determine that the context includes the user activity corresponding to a user travel motion, such as an exercise activity from a running motion.

The sensor 28 may also include a location sensor 40 to collect location data. The location sensor 40 may include, for example, a global positioning system (GPS). In one example, data from the GPS may be used to determine that the context includes the location of the user and/or of the apparatus 12 such as a particular meeting room, at home, abroad, a stadium, a park, etc. The sensor 28 may include an environmental sensor 42 to collect environmental data. The environmental sensor 42 may include a climate sensor (e.g., temperature sensor, moisture sensor, pressure sensor, etc.), a temporal sensor (e.g., a clock, etc.), and so on, or combinations thereof. In one example, data from a clock may be used to determine that the context includes a current time/day for the user and/or the apparatus 12. In another example, data from a thermometer may be used to determine that the context includes a temperature the user and/or the apparatus is experiencing.

Additionally, the sensor 28 may include an audio sensor 44 to collect audio. The audio sensor 44 may include, for example, a microphone. In one example, data from the microphone may be used to determine that the context includes the user is at work, traveling, at home, at a sporting event, a user preference, and so on, or combinations thereof. The sensor 28 may include a communication sensor 46 to collect communication data. The communication sensor 46 may include a task manager, a packet analyzer, and so on, or combinations thereof. In one example, data from the communication sensor 46 may be used to determine that the context includes the apparatus 12 is associated (e.g., paired, communicating, etc.) with a computing platform (e.g., a mobile device, a server, an access point, etc.). The communication data may include, for example, a packet count, a link status, identification data corresponding to the computing platform such as a media access control (MAC) address, and internet protocol (IP) address, a platform name, a user name, and so on, or combinations thereof.

It should be understood that the apparatus 12 may also include any other component. For example, the apparatus 12 may include a communication interface to provide a wide variety of communication functionality, such as cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/IEEE 802.11-2007, Wireless Local Area Network/LAN Medium Access Control (MAC) and Physical Layer (PHY) Specifications), Bluetooth (e.g., IEEE 802.15.1-2005, Wireless Personal Area Networks), WiMax (e.g., IEEE 802.16-2004), Global Positioning Systems (GPS), spread spectrum (e.g., 900 MHz), and other radio frequency (RF) telephony purposes. In addition, the apparatus 12 may include a user interface to provide one or more user instructions and/or user settings, as a standalone user interface and/or coupled with the application 14, the display 26, the audio sensor, and so on, or combinations thereof. For example, the user interface may include a command line interface, a graphical user interface, a key pad, a track pad, a touch screen, and so on, or combinations thereof.

Additionally, it should be understood that the components of the apparatus 12 may be on platform, off platform, and/or reside in the same or different real and/or virtual space as the apparatus 12, a computer server (e.g., a single server, a plurality of distributed real servers, a plurality of virtual servers, etc.), a plurality of associated platforms, and so on, or combinations thereof. In one example, the activity sensor 32 and/or the gesture sensor 34 may include an on-platform accelerometer, while the environmental sensor 42 may include an off-platform thermometer. In another example, the processor 22 and/or the display 26 may be co-located with a wristwatch, while the speaker 24 and/or the audio sensor 44 may be co-located with an earpiece.

Similarly, the architecture 10 may include a logic architecture 48 having components that may be on platform, off platform, and/or reside in the same or different real and/or virtual space as the apparatus 12, a computer server, a plurality of associated platforms, and so on, or combinations thereof. In one example, each of a plurality of associated computing platforms may include all or part of the logic architecture 48. In another example, the logic architecture 48 may be active in one of the plurality of associated platforms. For example, a negotiation among the plurality of associated platforms may determine which apparatus is to operate as a controller to provide instructions to one or more other platforms of the plurality. Moreover, a predetermined preference and/or a real-time instruction may determine the controller. In a further example, the logic architecture 48 may not be integral and/or active in any of the plurality of associated platforms, such as when the logic architecture 48 is co-located with a computer server to provide instructions to any computing platform.

Accordingly, the logic components of the logic architecture 48 may be functionally separate logic, processes, and/or threads, may run on the same computing device and/or distributed across multiple devices to run concurrently, simultaneously, in parallel, and/or sequentially, may be combined into one or more independent logic blocks or executables, and/or are described as separate components for ease of illustration. In addition, while examples may show separate components for illustration purposes, it is should be understood that one or more of the components of the apparatus 12 and/or of the logic architecture 48 may be implemented in one or more combined components. Thus, the logic architecture 48 may be generally implemented in a processor, such as a central processing unit (CPU), a graphical processing unit (GPU), a visual processing unit (VPU), a sensor, an operating system, an application, and so on, or combinations thereof. For example, the logic architecture 48 may be implemented in the application 14, the OS 16, a media framework, a hardware component, and so on, or combinations thereof.

The logic architecture 48 includes a context module 50 to determine a context corresponding to a user state such as, for example, an event associated with the user, a situation associated with the user, a condition associated with the user, and so on, or combinations thereof. The context may include a set of conditions, circumstances, and/or facts that surround and/or that are relevant to the user state, which may include a present state (e.g., a gesture, a posture, a position of a part of the user, etc.), a future state (e.g., a meeting, sleep, etc.), and so on, or combinations thereof. Thus, the context module 50 may place context data into perspective, may provide a meaning to context data, and so on, or combinations thereof. For example, while GPS data may be used to determine the location of the user, the context module 50 may determine that context includes the user is at a meeting based on the GPS data.

The context module 50 may poll the apparatus 12 for context data 66. In addition, the context module 50 may receive the context data 66 in periodic intervals (e.g., programmable intervals, random intervals, etc.). The context module 50 includes a sensor module 52 to process context sensor data by analyzing the sensor data from the sensor 28, by placing the sensor data into perspective, by providing a meaning to the sensor data, and so on, or combinations thereof. For example, the sensor module 52 may identify the data from the orientation sensor 30 and/or the activity sensor 32 to determine that the context includes the user is exercising. In another example, the sensor module 52 may identify the data from the location sensor 40 to determine that the context includes the user is at a meeting in a particular room. In addition, the sensor module 52 may identify data from the audio sensor 44 to determine that the context includes other people are in the room indicative of an ongoing meeting.

Additionally, the sensor module 52 may identify a kinematic value from the context data 66, and match the value to a reference model such as an accelerometer model, a gyroscope model, and so on, or combinations thereof. The match may be used to determine the context, such as the location of the apparatus 12 relative to a user plane (e.g., mid-sagittal plane, etc.). For example, movement of a body part may be restricted and/or may have a specific range of motion that may be used to determine the context (e.g., wearing on a particular wrist, etc.). In addition, the kinematic value may be matched to a reference model to indicate the orientation of the apparatus 12 relative to the user, such as to a user face, a user eye, and so on, or combinations thereof. Determining the context, such as which wrist the apparatus 12 is on and/or the orientation of the apparatus 12, may facilitate a power saving determination since the target component and/or a power mode may be vary depending on the location of the apparatus 12 (e.g., a used part of a wristwatch display may vary depending on wrist and motion/orientation).

Additionally, the sensor module 52 may classify the user activity (e.g., exercise activity, sleep activity, writing activity, work activity, school activity, etc.) and/or identify a motion of a user's body part (e.g., appendage, head, etc.) from the context data 66. For example, the sensor module 52 may determine that the motion is consistent with a writing pattern, and/or is never a writing pattern, based on a motion of the user's arm to classify the user activity (e.g., writing, etc.) and determine that the context includes the user is writing with a particular hand. Determining a context based on the activity type and/or body part motion may facilitate a power saving determination since, for example, the apparatus 12 may be turned off when it is secured to a wrist of a writing hand and the user is writing.

Additionally, the sensor module 52 may determine whether a component of the apparatus 12 is facing the user and/or whether the user is using a component of the apparatus 12. In one example, the apparatus 12 may include a wristwatch having a curved display and/or a plurality of displays. The sensor module 52 may determine that the context includes the user is viewing a part of the curved display and/or one or more displays of the plurality of displays, that the context includes the apparatus 12 is facing the user, and so on, or combinations thereof. In another example, where the apparatus 12 includes a tee shirt with e.g., a continuous display, the sensor module 52 may determine that the context includes the user is viewing a part of the display (e.g., based on feature data such as eye-tracking data). Thus, the power mode may be implemented in response to a determination that the apparatus 12 is facing the user, that the user is using the apparatus 12, and so on, or combinations thereof.

The illustrated context module 50 also includes a database module 54 to process database context data such as, for example, social network data, electronic communication data, calendar data, historical data, sensor data from one or more databases, and so on, or combinations thereof. For example, the context data 66 may include database context data from the application 14, the storage 18, the memory 20, and so on, or combinations thereof. In addition, the context data 66 may include database context data directly from a service provider database via a communication interface.

The social network data may include data from a social network such a relationship status, a check-in, an opinion (e.g., a like, a thumbs up, etc.), a comment, an event notification (e.g., an invite, etc.), and so on, or combinations thereof. Thus, the database module 54 may identify the database context data from the social network database and determine that the context includes the user is at a particular location with their spouse based on a check-in. The electronic communication data may include data from an electronic communication database such as an electronic mail communication, a short message (SMS) communication, an instant messaging (IM) communication, a work communication, a personal communication, a travel plan communication, and so on, or combinations thereof. Thus, the database module 54 may identify the electronic communication data from the electronic communication database and determine that the context includes the user is at work based on a work communication.

The calendar data may include data from a calendar database such as a personal calendar, a work calendar, a school calendar, a present and/or future meeting entry, an event entry, a trip entry, and so on, or combinations thereof. Thus, the database module 54 may identify calendar data from the calendar database and determine that the context includes the user is in a class. The historical data may include data from a database indicating a usage pattern of the apparatus 12 (e.g., used more frequently at a particular time of day, etc.), a power state pattern of a component (e.g., power used due to display resolution, etc.), a user activity pattern (e.g., work activity pattern, recreational activity pattern, etc.), and so on, or combinations thereof. Thus, the database module 54 may utilize the historical data from the database and determine that the context includes the user is at a gym based on a comparison of current data with the historical data. The sensor data may include data from a sensor database such as the environmental data, discussed above. Thus, the database module 54 may identify the environmental data from the sensor database and determine that the context includes a bright environment.

The context module 50 includes a companion module 56 to process companion context data such as, for example, platform data, link data, and so on, or combinations thereof. For example, the context data 66 may include companion context data from the communication sensor 46. The platform data may include identification data corresponding to an associated computing platform such as a media access control (MAC) address, and internet protocol (IP) address, a platform name, a user name, and so on, or combinations thereof. Thus, the companion module 56 may identify the platform data and determine that the context includes the apparatus 12 is paired with a smart phone, a tablet, and so on. The link data may include a packet count, a link status (e.g., signal strength, connection, etc.), a channel type including a virtual private network (VPN) connection, a secure socket layer (SSL) connection, a cryptographic key connection, a WiFi connection, a Bluetooth connection, RFID (radio frequency identifier) connection, a cellular connection, an Ethernet connection, a near field communication (NFC), and so on, or combinations thereof. Thus, the companion module 56 may identify the link data and determine that the context includes the apparatus 12 is paired with a smart phone over a Bluetooth connection.

The illustrated context module 50 also includes a user interface module 58 to process user context data such as, for example, user setting data, user instruction data, and so on, or combinations thereof. For example, the context data 66 may include user context data from the application 14, from the memory 20, and so on, or combinations thereof. Thus, the user context data may be stored and/or provided in real-time. The user setting data may indicate a preference associated with particular context data. Similarly, the user instruction data may indicate a preference associated with particular context data. Thus, the user interface module 58 may identify the user context data and determine that the context includes action is to occur via a computing platform associated with the apparatus 12 based on the setting and/or the instruction.

Accordingly, any combination of context data may be utilized to build a complete perspective for the context. For example, the sensor context data may be used with the user context data to determine that the context includes the user is exercising and action is to occur via a smart phone (e.g., video render, messaging, etc.) when the user travel motion transitions from walking to running. In addition, it should be understood that the context module 50 may include any other component to process other context data. For example, the context module 50 may include a security component (not shown) to identify and/or process security context data such as biometric data, challenge data, and so on, or combinations thereof.

The logic architecture includes a power management module 60 to specify a power mode applicable to a part of the apparatus 12 based on the context. The power mode may include a standby mode, a hibernate mode, an off mode, an on mode, and so on, or combinations thereof. In addition, the part of the apparatus 12 for which the power mode is specified may include an entire part apparatus 12, a component of the apparatus 12, and so on, or combinations thereof. Moreover, while conventional rule sets may be utilized, the power management module 60 may also utilize context to specify the power mode and cause a component of the apparatus 12 to utilize and/or save power. The power management module 60 may poll the apparatus 12 for data, such as power state data 68. In addition, the power management module 60 may receive the power state data 68 in periodic intervals (e.g., programmable intervals, random intervals, etc.).

The illustrated power management module 60 includes a power state module 62 to determine a power state of the apparatus 12. For example, the power state data 68 may indicate a state of the apparatus 12, such as an active state, an inactive state, a resolution state, a sound quality state, a backlight state, a color state, a contrast state, an intensity state, a dim state, and so on, or combinations thereof. The power state module 62 may identify the power state data 68 and determine, for example, that the display 26 of the apparatus 12 is active and rendering data at a relatively high resolution. Thus, while the power state data 68 may include information related to battery life and/or power consumption rate, the power state data 68 may also include an operation state of the apparatus 12 that directly effects the power profile of the apparatus 12 (e.g., the battery life, the present power consumption rate, etc.).

The power management module 60 also includes a power mode module 64 to specify the power mode based on the context. The power mode module 64 may, for example, provide power mode data 70 to the apparatus 12 to cause a part of the apparatus 12 to be deactivated and provide power mode data 72a to an associated computing platform 78a to cause a part of the computing platform 78a to be activated when, for example, the context includes that action is to occur via the associated computing platform 78a. For example, a user instruction (e.g., audio, touch, etc.) may indicate a user preference to use the computing platform 78a to text rather than the apparatus 12, wherein the power mode module 64 may specify that the entire apparatus 12 is to be deactivated (e.g., shut off, standby, etc.) and that the entire computing platform 78a is to be activated (e.g., woken up, etc.). In another example, the power management module 60 may provide the power mode data 70 to cause the display 26 of the apparatus 12 to be deactivated and provide the power mode data 72a to cause a display of the computing platform 78a to be activated.

Accordingly, for example, the power mode module 64 may provide the power mode data 70 to the apparatus 12 to cause an application of power only to a part of the apparatus 12, a relatively lower resolution at a part of the apparatus 12, a shutdown of a backlight to a part of the apparatus 12, a modification of a color rendered at a part of the apparatus 12, a modification of a contrast rendered at a part of the apparatus 12, a modification of an intensity rendered at a part of the apparatus 12, a dimming to a part of the apparatus 12, and so on, or combinations thereof. For example, the power mode data 70 may cause a relatively lower resolution for a part of the display 26 not facing the user, for a part of the display 26 that the user in not viewing, and so on, or combinations thereof. In addition, the power mode data 70 may cause a backlight to be turned off for a part of the display 26 not facing the user, for a part of the display 26 that the user is not viewing, and so on, or combinations thereof. Moreover, the power mode data 70 may cause a dimension of a part (e.g., a virtual screen, etc.) of the display 26 to change.

Similarly, the power mode data 70 may cause a modification of a color, a contrast, and/or an intensity for a part of the display 26 not facing the user, for a part of the display 26 that the user is not viewing, and so on, or combinations thereof. In addition, the power mode data 70 may cause a dim for a part of the display 26 not facing the user, for a part of the display 26 that the user is not viewing, and so on, or combinations thereof. The power mode data 70 may also cause power to be output only to a part of the display 26 facing the user, only to a part of the display 26 that the user is viewing, and so on, or combinations thereof. Moreover, the power mode data 70 may cause a relatively lower resolution at a part of the display 26 facing the user when the context includes an exercise activity corresponding to a user travel motion. For example, the power mode module 64 may specify a relatively lower resolution for the display 26 to save power when the context includes the user is exercising since, for example, the user may only glance at the content being rendered. Additionally, the power mode data 70 may cause an activation of one or more displays of a plurality of opposing displays facing the user (and/or that the user is viewing) and cause a deactivation of any other display of the plurality not facing the user (and/or that the user is not viewing).

Accordingly, the power module 64 may consider the power state data 68 when, for example, the power mode module 64 is concerned with reducing and/or increasing a state factor (e.g., resolution, color, etc.) by some amount (e.g., a percentage of change). The power mode module 64 may also specify the power mode without considering the present power state of the apparatus 12. For example, a determination may be made to shut the apparatus 14 down based on the context without regard to the present power state. In addition, the power mode data 70 may be provided to the apparatus 12 on demand and/or via a periodic interval. Moreover, the power mode module 64 may account for a set of associated computing platforms 12, 78a . . . 78n by specifying the power mode of one or more components of each of a plurality of platforms 12, 78a . . . 78n. The power mode may be based on, for example, the context and/or the present power state corresponding to one or more of the plurality 12, 78a . . . 78n. Thus, while the associated computing platforms 78a . . . 78n may also provide context data 74a . . . 74n and/or power state data 76a . . . 76n, the power mode specified for the computing platforms 78a . . . 78n may be based on the context for the apparatus 12, and/or vice versa.

Figure 2A:
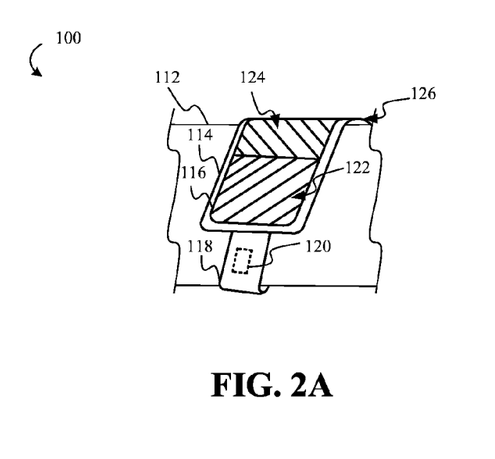
FIGS. 2A and 2B are block diagrams of example architectures to manage power according to an embodiment.
Figure 2B:
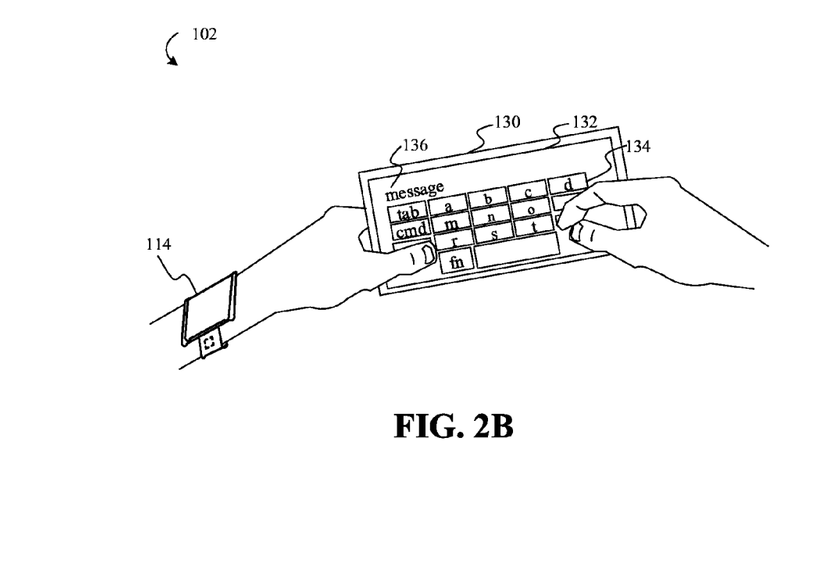

Turning now to FIGS. 2A and 2B, architectures 100, 102 to manage power are shown according to an embodiment. The architecture 100 is similar to the architecture 10 (FIG. 1), discussed above. For example, the architecture 100 includes an apparatus 114 that may have one or more components similar to the components of the apparatus 12 and/or the logic architecture 48. In the illustrated example, the apparatus 114 includes a wearable apparatus attached to a part of a user's body 112, such as a wrist. Thus, the wearable apparatus 114 includes a wristwatch form factor having a display 116 similar to the display 26 (FIG. 1), discussed above. In addition, the wearable apparatus 114 includes an attachment portion 118, such as band, and an attachment sensor 120 similar to the attachment sensor 38 (FIG. 1), discussed above. The attachment sensor 120 may include, for example, an IR sensor to detect an intensity value and/or a microphone to detect a pulse that may be used to determine whether the wearable apparatus 114 is attached to the user. In addition, the attachment sensor 120 may include a clasp sensor with a capability to provide a close signal and/or an open signal to a component of the wearable apparatus 114 (e.g., memory, processor, etc.) to be used to determine whether the wearable apparatus 114 is attached to the user, to be use to wake up a component of the wearable apparatus 114, and so on, or combinations thereof.

In the illustrated example, a power mode has been specified and implemented for the display 116 of the wearable apparatus 114 based on a context corresponding to a state of the user and/or the wearable apparatus 114. For example, context data may be used to determine that the context includes the user is traveling via public transportation from calendar data indicating that the user is scheduled to travel by train over a specific temporal period. In addition, location data may be used to determine that the context includes the user is traveling in a direction consistent with the calendar data. Moreover, audio data may be used to determine that the context includes train audio.

The context data may also be used to determine that the context includes the user is using the display 116 on the wearable apparatus 114 and/or the display 116 is facing the user. For example, any context data may be employed to determine that the user is using the display 116 by viewing the display 116, by having a body part (e.g., wrist, arm, etc.) intentionally positioned for another user to view display 116 (e.g., simultaneously with the user, instead of the user, etc.), and so on, or combinations thereof. In one example, orientation data and/or acceleration data may be used to determine that the context includes the user has flipped a particular wrist and is maintaining the orientation of the wearable apparatus 114. In this regard, a kinematic value and/or a movement of a part of the user's body may be determined to confirm that the user is using the display 116 on a particular side of the user's body (e.g., wearing on a left wrist, outstretched arm to right body side to simultaneously view, etc.) and/or at a particular orientation. In addition, a feature sensor such as a front-facing camera (not shown) may collect feature data such as eye-tracking data used to determine that the context includes the user is using the display 116 and/or to determine a part of the display 116 that is facing the user. Historical data may also be used to determine that the context includes movement (e.g., a particular wrist flip followed by a relatively still movement) that is consistent with a usage pattern (e.g., view) for using the display 116.

A power state of the display 116 and/or of the wearable apparatus 114 may also be determined. For example, an initial power state of display 116 may indicate that the entire display 116 is rendering content at a highest possible resolution, color, contrast, intensity, and so on, or combinations thereof. Thus, the wearable apparatus 114 may be wasting power since only a part 122 of the display 116 is in full view, a part 124 of the display 116 is fading from view, and a part 126 of the display 116 is not in view. Based on the context and/or the power state, a power mode is specified to change a power setting and conserve power. For example, the power mode may cause the part 122 of the display 116 to be kept at the highest possible resolution, color, contrast, intensity, etc. while the part 124 may be modified to a relatively lower resolution, color, contrast, intensity, etc. In addition, the power mode may cause the part 126 to be modified to an even lower resolution, color, contrast, intensity, etc. than the part 124. Thus, power is conserved. Additionally, changes may be implemented dynamically based on changes in context. For example, the context may change from the user sitting in the train to the user walking in the train, wherein an updated power mode may cause the part 122 to render at the same and/or lower resolution, color, contrast, intensity, etc. as the parts 124, 126 when, for example, the user is to only glance and not focus on the part 124.

Although the apparatus 114 is shown with a single curved display, it should be understood that any number of displays in any orientation may be utilized for any type of wearable apparatus. For example, the wearable apparatus 114 may include substantially opposing displays such as two displays on opposite and/or nearly opposite sides of the wrist (e.g., one on the anterior side of the wrist and one on the posterior side of the wrist). Thus, in one example, a rule set may be implemented for the two substantially opposing displays, which may be overridden by direct commands, including the rule set shown in example Table 1 based on the context as follows:

| If: | Then: |
| --- | --- |
| User's face is detected, and Display 1 is <180 degree tilt | Maintain or set Display 1 as active and Display 2 as inactive |
| User activity is walking or running with both arms in characteristic motion | Maintain or set Display 1 and Display 2 as inactive, lower resolution of Display 1 |
| User activity is walking, running with one arm with relatively restricted motion | Maintain or set Display 1 as active |

In the illustrated example of FIG. 2B, the architecture 102 includes a computing platform 130, such as a tablet, that is associated with the wearable apparatus 114. For example, the apparatus 114 may be linked with the computing platform 130 over a secure and/or authenticated connection. Thus, the platform 130 may be the same and/or similar as the computing platforms 78a . . . 78n (FIG. 1), described above. A power mode has been specified and implemented for the wearable apparatus 114 based on a context corresponding to a user state. For example, context data may be used to determine that the context includes the user is meeting with co-workers in a meeting room determined from calendar data indicating that the user is scheduled to meet with the co-workers in the meeting room. In addition, location data may be used to determine that the context includes the user is at a conference room that is consistent with the calendar data. Moreover, audio data may be used to determine that the context includes environmental audio that is consistent with a meeting.

The data may also be used to determine that the context may includes the user is using the platform 130, which may be a necessary platform for the meeting. While orientation data and/or acceleration data may be used to determine that the user has flipped a particular wrist and is maintaining the orientation of the wearable apparatus 114, the context nonetheless indicates that the user does not need nor want the apparatus 114 operate. For example, a user setting and/or a user instruction may be used to determine that the context includes a preference associated the user when the user is in a business meeting. In addition, a feature sensor such as a front-facing camera (not shown) may collect feature data such as eye-tracking data used to determine that the context includes the user is not using the display 116. Moreover, electronic communication data may be used to determine that the context includes the user will be communicating with a client using a proprietary application and/or environment accessible to a work platform. Additionally, historical data may be used to determine that the context includes the user does not use the wearable apparatus 114 during business meetings.

Based on the context and/or a power state, a power mode is specified to conserve power across a plurality of computing platforms. For example, the power mode may cause the apparatus 114 to be deactivated and a display 132 of the apparatus to be activated. In addition, a backlight of a keyboard 134 may be turned on when the user writes a message 136 to a client, and may be turned off when the message to the client is complete. Thus, power is conserved for the apparatus 114 and/or the platform 130. Additionally, changes may be implemented dynamically based on changes in context. For example, the context may change from the user sitting in meeting room with co-workers to sitting in the meeting room alone, wherein an updated power mode may cause the wearable apparatus 114 to be activated and the platform 130 to be deactivated. In one example, context data from the platform 130 may be used to specify the power mode for the wearable apparatus 114. In another example, a sensor such as a camera in the meeting room (not shown) may provide the context data to specify the power mode for the platform and/or the apparatus 114. In a further example, the power mode may be specified based on the context data previously used, such as calendar context data indicating that the meeting is complete.

Additionally, it should be understood that peer devices may operate together. For example, the wearable apparatus 114 may operate with the computing platform 130 to share processing, applications, connectivity, etc. and vice versa. In one example, when the meeting has ended, the user may flip the left wrist and gaze at the display 116. In response, a power mode may cause the display 132 to deactivate and the display 116 to activate. In addition, the power mode may cause the wearable apparatus 114 to utilize the memory of the computing platform 130, to use the main processor of the computing platform, to use a network connection of the computing platform, and so on, or combinations thereof. For example, the user may launch an application to begin watching a video on display 116. The processor of the computing platform 130 may remain active to communicate with a remote content server based on context, such as when the power status indicates that the battery life of the computing platform 130 is relatively full, when the link is relatively higher speed, a user preference, and so on, or combinations thereof. The computing platform 130 may also buffer the content using its processor and memory, and provide the content to the display 116. Thus, the wearable apparatus 114 saves power by not requiring buffering, decoding, and so on. In addition, the wearable apparatus 114 benefits from, for example, a relatively faster processor (if faster), a dedicated processor (e.g., if decoding via a GPU), a relatively faster link speed (if faster), and so on, or combinations thereof.

In addition, it should be understood that security context data may be implemented among one or more peer devices. For example, private information may not be accessed and/or utilized until the user's identity is checked and/or verified. For example, a personal video from a content server may not be accessed and/or decoded by the computing platform 130, and/or rendered by the display 116, until a security component in the wearable apparatus 114 and/or the computing platform 130 verifies the identify of the user. In one example, a biometric component may utilize data from a camera of the wearable apparatus 114 and/or the computing platform 130 to process scan context data, such as a retina scan, to verify the identify of the user. In another example, the biometric component may utilize data from a touch screen of the wearable apparatus 114 and/or the computing platform 130 to process print context data, such as a fingerprint scan, to verify the identity of the user. The security component may also include a challenge component, such as password component (e.g., written, verbal, etc.), to process challenge context data. In addition, the companion context data may be utilized to determine, for example, whether the peer devices are utilizing a secure connection.

Figure 3:
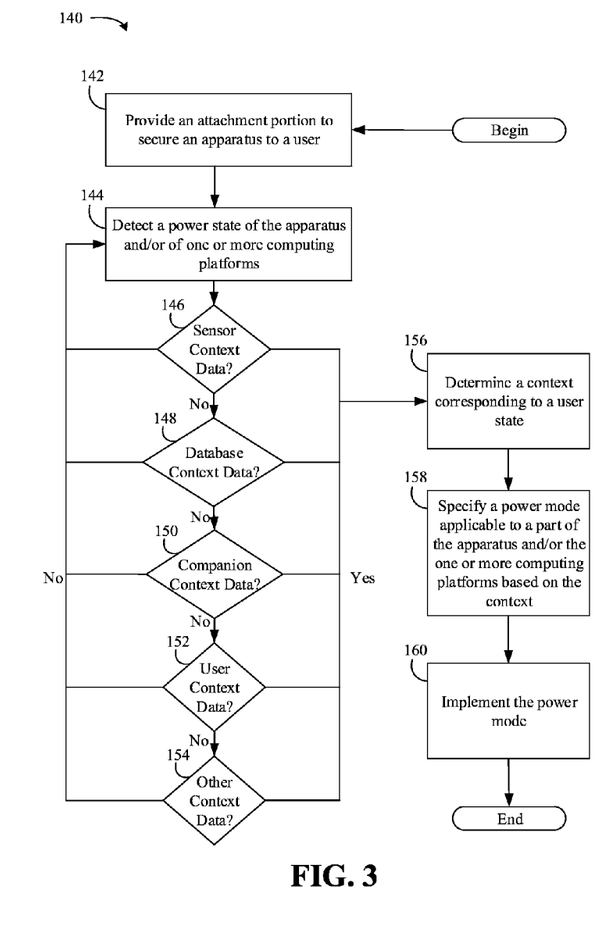
FIG. 3 is a flowchart of an example of a method to manage power according to an embodiment.

FIG. 3 shows a method 140 to manage power. The method 140 may be implemented as a set of logic instructions and/or firmware stored in a machine- or computer-readable storage medium such as random access memory (RAM), read only memory (ROM), programmable ROM (PROM), flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), CMOS or transistor-transistor logic (TTL) technology, or any combination thereof. For example, computer program code to carry out operations shown in the method 140 may be written in any combination of one or more programming languages, including an object oriented programming language such as C++ or the like and conventional procedural programming languages, such as the "C" programming language or similar programming languages. Moreover, the method 140 may be implemented using any of the herein mentioned circuit technologies.

Illustrated processing block 142 involves providing an attachment portion to secure an apparatus a user. For example, the attachment portion may be provided when the apparatus includes a wearable apparatus. In one example, the attachment portion may include a wristband having an attachment sensor to determine whether the user is wearing the apparatus. Illustrated processing block 144 provides for detecting a power state of the apparatus and/or of one or more computing platforms. For example, the present power state of one or more of a plurality of associated (e.g., paired, communicating, etc.) computing platforms may be determined. The power status may include, for example, a present resolution status, a present component activity status, and so on, or combinations thereof.

A determination may be made as to whether context data is detected to determine a context, such as whether the user has a palm on a table, whether the user is in a meeting, and so on, or combinations thereof. A determination is made as to whether sensor context data is collected and/or provided at block 146. For example, the sensor context data may include orientation data, activity data, gesture data, feature data, attachment data, location data, or environmental data, and so on, or combinations thereof. If so, the processing block 156 determines a context corresponding to a user state using the sensor context data. If not, the method 140 may return to the processing block 144 and/or proceed to block 148, wherein a determination is made as to whether database context data is collected and/or provided. For example, the database context may include social network data, electronic communication data, calendar data, historical data, sensor data, and so on, or combinations thereof. If so, the processing block 156 determines a context corresponding to a user state using the database context data. If not, the method 140 may return to the processing block 144 and/or proceed to block 150, wherein a determination is made as to whether companion context data is collected and/or provided.

For example, the companion context data may include platform data, link data, and so on, or combinations thereof. In one example, the link data may indicate that one or more computing platforms are associated with the apparatus. If so, the processing block 156 determines a context corresponding to a user state using the companion context data. If not, the method 140 may return to the processing block 144 and/or proceed to block 152, wherein a determination is made as to whether user context data is collected and/or provided. For example, the user context data may include user setting data, user instruction data, direct command data, and so on, or combinations thereof. In one example, the user context data may indicate a preference associated with the context. If so, the processing block 156 determines a context corresponding to a user state using the user context data. If not, the method 140 may return to the processing block 144 and/or proceed to block 154, wherein a determination is made as to whether any other type of context data is collected and/or provided. For example, the other context data may include security context data such as scan data, challenge data, link data, and so on, or combinations thereof. If so, the processing block 156 determines a context corresponding to a user state using the other context data. If not, the method 140 may return to the processing block 144.

Illustrated processing block 158 provides for specifying a power mode applicable to a part of the apparatus and/or the one or more computing platforms based on the context. The part of the apparatus for which the power mode is specified may be the entire apparatus, a component of the apparatus (e.g., display, sensor, etc.), and so on, or combinations thereof. In addition, the power state (e.g., power settings, etc.) may be adjusted for the apparatus and/or the computing platforms. In one example, a power management component may be located on one or more of a plurality of associated platforms (e.g., peer devices, the apparatus associated with one or more of the computing platforms, etc.), or located on a server separate from the plurality of associated platforms, wherein a sensor array on each device may allow e.g., activity determination, orientation determination face detection, etc. to be used to adjust power management settings across the plurality of associated devices. In another example, a sensor array on one of the plurality of associated platforms may allow e.g., the activity determination, orientation determination face detection, etc. to be used to adjust power management settings for only that platform, across a subset of the plurality of associated platforms, across all of the plurality of associated platforms, and so on, or combinations thereof.

Illustrated processing block 160 provides for implementing the power mode. In one example, the power mode may be implemented in response a determination that one or more components of the apparatus are facing the user, a determination that one or more components of the apparatus are being used by the user. In addition, the determination may involve a determination whether one or more components of the associated computing platforms are facing the user, are being used by the user, and so on, or combinations thereof. In one example, the power mode causes a part of the apparatus to be deactivated and a part one of the computing platforms to be activated. In another example, the power mode cause an application of power only to the part of the apparatus, a relatively lower resolution at the part of the apparatus, a shutdown of a backlight to the part of the apparatus, a modification of one or more of a color, a contrast, or an intensity to the part of the apparatus, a dimming to the part of the apparatus, and so on, or combinations thereof. The power mode may also cause a relatively lower resolution at a part of a display facing the user when, for example, the context includes an exercise activity corresponding to a user travel motion. In addition, the power mode may cause an activation of one or more displays of a plurality of opposing displays facing the user (and/or being used by the user) and a deactivation of one or more displays of the plurality of opposing displays not facing the user (and/or not being used by the user).

While the independent blocks and/or a particular order has been show, it should be understood that one or more of the blocks may be combined and/or the method 140 may flow in any order. For example, the determinations at blocks 146 to 154 may be accomplished simultaneously and/or sequentially in any order. In another example, the processing block 156 may wait for the determinations at two or more of the blocks 146 to 154 to be made before determining the context. In addition, one or more blocks may be bypassed such as, for example, the block processing 142, the processing block 160, one or more of the bocks 146 to 154, and so on, or combinations thereof.

Thus, embodiments may include a wearable companion device, such as a smart watch, which may operate with another computing platform, such as a smart phone, to use the smart phone's processing, applications, connectivity, and so on, or combinations thereof. The wearable companion device may create a power need, not only for itself but also in an ensemble of peer devices (e.g., a main device, a companion device, etc.). Power conservation may be implemented in the worn device using, for example, tracked worn orientation, presence of a wearer, and other factors to wake only parts of a distributed resources (e.g., among a smart phone and other devices). For example, a sensor array on each peer device in the ensemble may capture the context data for any peer device in the ensemble (e.g., for itself using an accelerometer, for a wristwatch using a camera to collect image data including the movement and/or location of the wristwatch, etc.). Thus, a power status of all devices in an ensemble may be determined, and one or more of device orientation, face detection, activity determination, etc. may occur, wherein a power setting may be adjusted across devices based on the context data. A power mode that is implemented to adjust a power setting and/or status may be specified from one of the peer devices of the ensemble, may be specified by a server separate from the devices of the ensemble, and so on, or combinations thereof.

Figure 4:
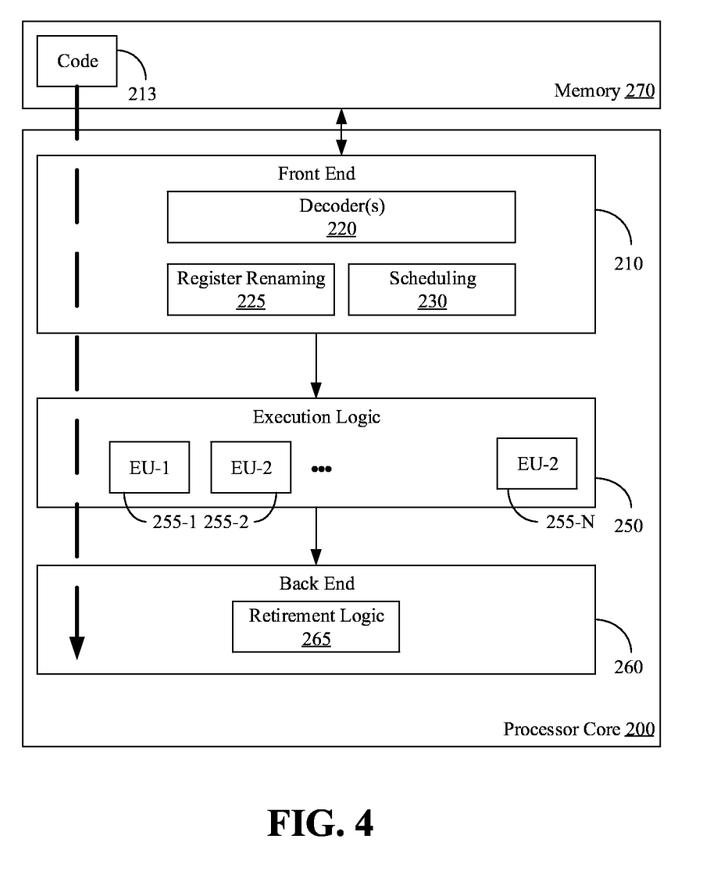
FIG. 4 is a block diagram of an example of a processor according to an embodiment.

Turning now to FIG. 4, a processor core 200 according to one embodiment is shown. The processor core 200 may be the core for any type of processor, such as a micro-processor, an embedded processor, a digital signal processor (DSP), a network processor, or other device to execute code to implement the technologies described herein. Although only one processor core 200 is illustrated in FIG. 4, a processing element may alternatively include more than one of the processor core 200 illustrated in FIG. 4. The processor core 200 may be a single-threaded core or, for at least one embodiment, the processor core 200 may be multithreaded in that it may include more than one hardware thread context (or "logical processor") per core.

FIG. 4 also illustrates a memory 270 coupled to the processor 200. The memory 270 may be any of a wide variety of memories (including various layers of memory hierarchy) as are known or otherwise available to those of skill in the art. The memory 270 may include one or more code 213 instruction(s) to be executed by the processor 200 core, wherein the code 213 may implement the architectures 10 (FIG. 1), 100, 102 (FIGS. 2A and 2B), and/or the method 140 (FIG. 3), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end 210 also includes register renaming logic 225 and scheduling logic 230, which generally allocate resources and queue the operation corresponding to the convert instruction for execution.

The processor 200 is shown including execution logic 250 having a set of execution units 255-1 through 255-N. Some embodiments may include a number of execution units dedicated to specific functions or sets of functions. Other embodiments may include only one execution unit or one execution unit that may perform a particular function. The illustrated execution logic 250 performs the operations specified by code instructions.

After completion of execution of the operations specified by the code instructions, back end logic 260 retires the instructions of the code 213. In one embodiment, the processor 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 4, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 5:
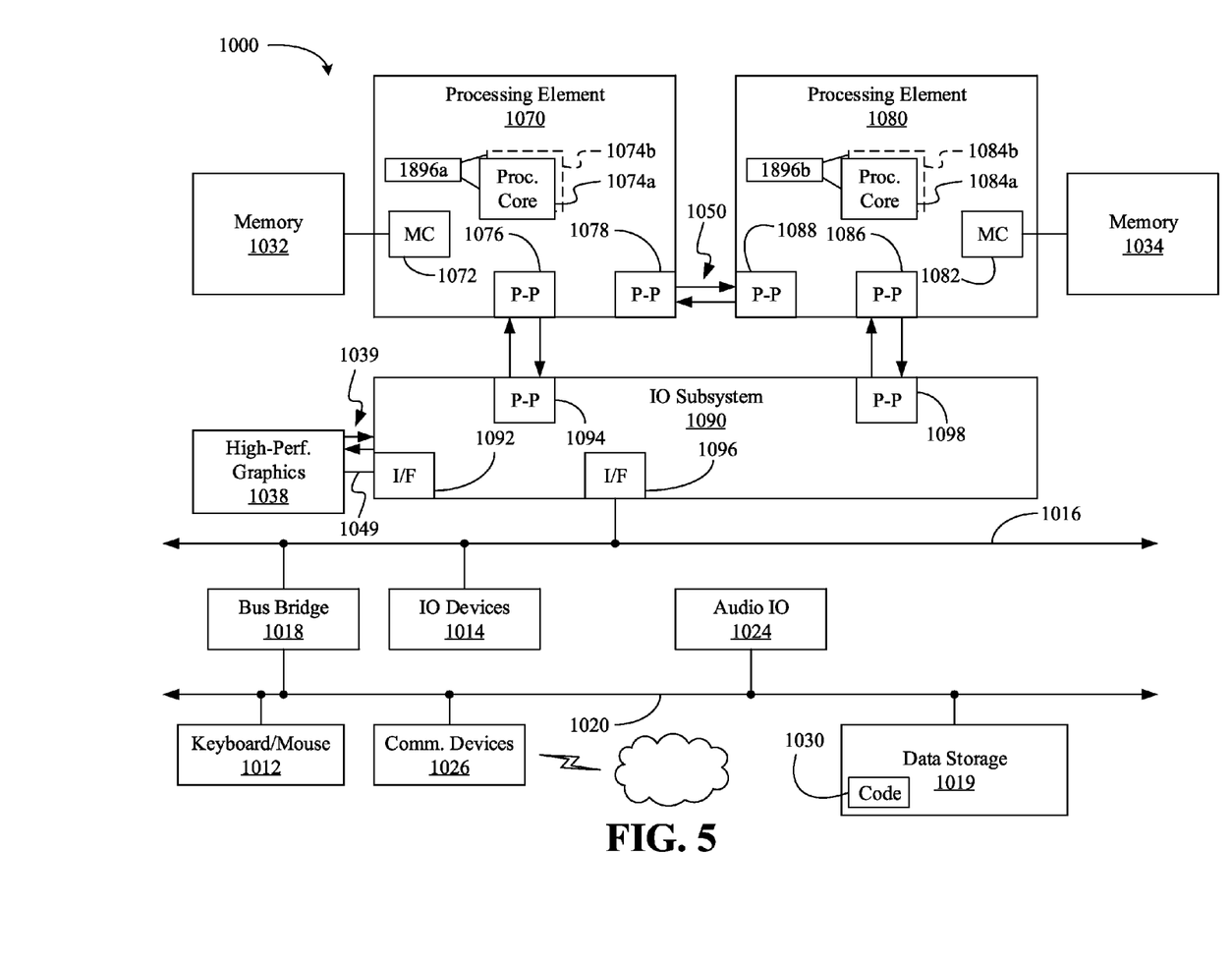
FIG. 5 is a block diagram of an example of a system according to an embodiment.

FIG. 5 shows a block diagram of a system 1000 in accordance with an embodiment. Shown in FIG. 5 is a multiprocessor system 1000 that includes a first processing element 1070 and a second processing element 1080. While two processing elements 1070 and 1080 are shown, it is to be understood that an embodiment of system 1000 may also include only one such processing element.

System 1000 is illustrated as a point-to-point interconnect system, wherein the first processing element 1070 and second processing element 1080 are coupled via a point-to-point interconnect 1050. It should be understood that any or all of the interconnects illustrated in FIG. 5 may be implemented as a multi-drop bus rather than point-to-point interconnect.

As shown in FIG. 5, each of processing elements 1070 and 1080 may be multicore processors, including first and second processor cores (i.e., processor cores 1074a and 1074b and processor cores 1084a and 1084b). Such cores 1074, 1074b, 1084a, 1084b may be configured to execute instruction code in a manner similar to that discussed above in connection with FIG. 4.

Each processing element 1070, 1080 may include at least one shared cache 1896. The shared cache 1896a, 1896b may store data (e.g., instructions) that are utilized by one or more components of the processor, such as the cores 1074a, 1074b and 1084a, 1084b, respectively. For example, the shared cache may locally cache data stored in a memory 1032, 1034 for faster access by components of the processor. In one or more embodiments, the shared cache may include one or more mid-level caches, such as level 2 (L2), level 3 (L3), level 4 (L4), or other levels of cache, a last level cache (LLC), and/or combinations thereof While shown with only two processing elements 1070, 1080, it is to be understood that the scope is not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There may be a variety of differences between the processing elements 1070, 1080 in terms of a spectrum of metrics of merit including architectural, microarchitectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

First processing element 1070 may further include memory controller logic (MC) 1072 and point-to-point (P-P) interfaces 1076 and 1078. Similarly, second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC logic 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076, 1086 and 1084, respectively. As shown in FIG. 5, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple graphics engine 1038 to I/O subsystem 1090. Alternately, a point-to-point interconnect 1039 may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope is not so limited.

As shown in FIG. 5, various I/O devices 1014 such as the display 26 (FIG. 1) and/or the display 116 (FIGS. 2A and 2B) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026 (which may in turn be in communication with a computer network), and a data storage unit 1019 such as a disk drive or other mass storage device which may include code 1030, in one embodiment. The code 1030 may include instructions for performing embodiments of one or more of the methods described above. Thus, the illustrated code 1030 may implement the architectures 10 (FIG. 1), 100, 102 (FIGS. 2A and 2B), and/or the method 140 (FIG. 3), already discussed. Further, an audio I/O 1024 may be coupled to second bus 1020.

Note that other embodiments are contemplated. For example, instead of the point-to-point architecture of FIG. 5, a system may implement a multi-drop bus or another such communication topology. Also, the elements of FIG. 5 may alternatively be partitioned using more or fewer integrated chips than shown in FIG. 5.

Additional Notes and Examples

Examples may include subject matter such as a method, means for performing acts of the method, at least one machine-readable medium including instructions that, when performed by a machine cause the machine to performs acts of the method, or an apparatus or system to manage power according to embodiments and examples described herein.

Example 1 may include an apparatus comprising an attachment portion to secure the apparatus to a user. The apparatus may also include a context module to determine a context corresponding to a user state. The apparatus may also include a power management module to specify a power mode applicable to a part of the apparatus based on the context.

Example 2 may include the subject matter of Example 1 and further optionally may include, wherein the apparatus includes a wearable wristwatch, and wherein the attachment portion includes a band.

Example 3 may include the subject matter of any of Example 1 to Example 2 and further optionally may include a sensor module to process sensor context data including one or more of orientation data, activity data, gesture data, feature data, attachment data, location data, or environmental data from one or more sensors, a database module to process database context data including one or more of social network data, electronic communication data, calendar data, historical data, or sensor data from one or more databases, a companion module to process companion context data including one or more of platform data or link data indicating that one or more computing platforms are associated with the apparatus, or a user interface module to process user context data including one or more of user setting data or user instruction data indicating a preference associated with the context.

Example 4 may include the subject matter of any of Example 1 to Example 3 and further optionally may include, wherein a kinematic value is to be matched with a reference model to indicate the location of the apparatus relative to a user plane when the apparatus is secured to the user.

Example 5 may include the subject matter of any of Example 1 to Example 4 and further optionally may include, wherein user activity is to be classified and a motion of one or more user appendages is to be identified when the apparatus is secured to the user.

Example 6 may include the subject matter of any of Example 1 to Example 5 and further optionally may include, wherein one or more of the user setting data or the user instruction data is to indicate that action is to occur via at least one of the computing platforms associated with the apparatus, and wherein the power mode is to cause a part of the apparatus to be deactivated and a part of the at least one of the computing platforms to be activated.

Example 7 may include the subject matter of any of Example 1 to Example 6 and further optionally may include, wherein the power mode is to cause one or more of an application of power only to the part of the apparatus, a relatively lower resolution at the part of the apparatus, a shutdown of a backlight to the part of the apparatus, a modification of one or more of a color, a contrast, or an intensity to the part of the apparatus, or a dimming to the part of the apparatus.

Example 8 may include the subject matter of any of Example 1 to Example 7 and further optionally may include, wherein the part of the apparatus includes one or more of a continuous display, a discrete display, a curved display, or a plurality of opposing displays.

Example 9 may include the subject matter of any of Example 1 to Example 8 and further optionally may include, wherein the power mode is to cause a relatively lower resolution at a part of the display facing the user when the context includes an exercise activity corresponding to a user travel motion.

Example 10 may include the subject matter of any of Example 1 to Example 9 and further optionally may include, wherein the power mode is to cause an activation of at least one display of the plurality of opposing displays facing the user and a deactivation of at least one display of the plurality of opposing displays not facing the user.

Example 11 may include the subject matter of any of Example 1 to Example 10 and further optionally may include, wherein the power mode is to be implemented in response to one or more of a determination that one or more components of the apparatus is facing the user or is being used by the user.

Example 12 may include the subject matter of any of Example 1 to Example 11 and further optionally may include, wherein the power management module is to determine a present power state of the apparatus.

Example 13 may include a method to manage power comprising determining a context corresponding to a user state. The method may also include specifying a power mode applicable to a part of a wearable apparatus based on the context.

Example 14 may include the subject matter of Example 13 and further optionally may include, wherein the apparatus includes a wearable wristwatch, and wherein the attachment portion includes a band.

Example 15 may include the subject matter of any of Example 13 to Example 14 and further optionally may include processing sensor context data including one or more of orientation data, activity data, gesture data, feature data, attachment data, location data, or environmental data from one or more sensors, processing database context data including one or more of social network data, electronic communication data, calendar data, or sensor data from one or more databases, processing companion context data including one or more of platform data or link data indicating that one or more computing platforms are associated with the apparatus, or processing user context data including one or more of user setting data or user instruction data indicating a preference associated with the context.

Example 16 may include the subject matter of any of Example 13 to Example 15 and further optionally may include, wherein a kinematic value is matched with a reference model to indicate the location of the apparatus relative to a user plane when the apparatus is secured to the user.

Example 17 may include the subject matter of any of Example 15 to Example 16 and further optionally may include wherein user activity is classified and a motion of one or more user appendages is identified when the apparatus is secured to the user.

Example 18 may include the subject matter of any of Example 15 to Example 17 and further optionally may include, wherein one or more of the user setting data or the user instruction data indicates that action occurs via at least one of the computing platforms associated with the apparatus, and wherein the power mode causes a part of the apparatus to be deactivated and a part of the at least one of the computing platforms to be activated.

Example 19 may include the subject matter of any of Example 15 to Example 18 and further optionally may include, wherein the power mode causes one or more of an application of power only to the part of the apparatus, a relatively lower resolution at the part of the apparatus, a shutdown of a backlight to the part of the apparatus, a modification of one or more of a color, a contrast, or an intensity to the part of the apparatus, or a dimming to the part of the apparatus.

Example 20 may include the subject matter of any of Example 15 to Example 19 and further optionally may include, wherein the part of the apparatus includes one or more of a continuous display, a discrete display, a curved display, or a plurality of opposing displays.

Example 21 may include the subject matter of any of Example 15 to Example 20 and further optionally may include, wherein the power mode causes a relatively lower resolution at a part of a display facing the user when the context includes an exercise activity corresponding to a user travel motion.

Example 22 may include the subject matter of any of Example 15 to Example 21 and further optionally may include, wherein the power mode causes an activation of at least one display of a plurality of opposing displays facing the user and a deactivation of at least one display of the plurality of opposing displays not facing the user.

Example 23 may include the subject matter of any of Example 15 to Example 22 and further optionally may include, wherein the power mode is implemented in response to one or more of a determination that one or more components of the apparatus is facing the user or is being used by the user.

Example 24 may include the subject matter of any of Example 15 to Example 23 and further optionally may include, determining a present power state of the apparatus.

Example 25 may include at least one computer-readable medium including one or more instructions that when executed on one or more computing devices causes the one or more computing devices to perform the method of any of Example 13 to Example 24.

Example 26 may include an apparatus including means for performing the method of any of Example 13 to Example 24.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Embodiments are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments may be practiced without, or with variation of, these specific details. The description is thus to be regarded as illustrative instead of limiting.

Some embodiments may be implemented, for example, using a machine or tangible computer-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated. Additionally, it is understood that the indefinite articles "a" or "an" carry the meaning of "one or more" or "at least one". In addition, as used in this application and in the claims, a list of items joined by the terms "one or more of" and "at least one of" can mean any combination of the listed terms. For example, the phrases "one or more of A, B or C" can mean A; B; C; A and B; A and C; B and C; or A, B and C.

Those skilled in the art will appreciate from the foregoing description that the broad techniques of the embodiments may be implemented in a variety of forms. Therefore, while the embodiments have been described in connection with particular examples thereof, the true scope of the embodiments should not be so limited since other modifications will become apparent to the skilled practitioner upon a study of the drawings, the specification, and following claims.

We claim:

1. An apparatus comprising:
  an attachment portion to secure the apparatus to a user; and
  a context module to determine a context corresponding to a user state, wherein a first power mode applicable to at least a part of the apparatus and a second power mode applicable to at least a part of one or more computing platforms external to and associated with the apparatus are to be specified based on the context, the first power mode to cause a disruption to the part of the apparatus and the second power mode to cause an activation to the part of the one or more computing platforms when the context is to indicate that action is to occur via the one or more computing platforms.

2. The apparatus of claim 1, wherein the apparatus includes a wearable wristwatch, and wherein the attachment portion includes a band.

3. The apparatus of claim 1, further including one or more of:
  a sensor module to process sensor context data including one or more of orientation data, activity data, gesture data, feature data, attachment data, location data, or environmental data from one or more sensors;
  a database module to process database context data including one or more of social network data, electronic communication data, calendar data, historical data, or sensor data from one or more databases;
  a companion module to process companion context data including one or more of platform data or link data indicating that the one or more computing platforms are associated with the apparatus; or
  a user interface module to process user context data including one or more of user setting data or user instruction data indicating a preference associated with the context.

4. The apparatus of claim 3, wherein a kinematic value is to be matched with a reference model to indicate the location of the apparatus relative to a user plane when the apparatus is secured to the user.

5. The apparatus of claim 3, wherein user activity is to be classified and a motion of one or more user appendages is to be identified when the apparatus is secured to the user.

6. The apparatus of claim 3, wherein one or more of the user setting data or the user instruction data is to indicate that the action is to occur via the one or more computing platforms associated with the apparatus.

7. The apparatus of claim 1, wherein the first power mode is to cause an application of power only to the part of the apparatus and one or more of a relatively lower resolution at the part of the apparatus, a shutdown of a backlight to the part of the apparatus, a modification of one or more of a color, a contrast, or an intensity to the part of the apparatus, or a dimming to the part of the apparatus.

8. The apparatus of claim 1, wherein the part of the apparatus includes one or more of a continuous display screen, a discrete display screen, a curved display screen, or a plurality of opposing display screens.

9. The apparatus of claim 8, wherein the first power mode is to cause a relatively lower resolution at a part of the display screen facing the user when the context includes an exercise activity corresponding to a user travel motion.

10. The apparatus of claim 8, wherein the first power mode is to cause an activation of at least one display screen of the plurality of opposing display screens facing the user and a deactivation of at least one display screen of the plurality of opposing display screens not facing the user.

11. The apparatus of claim 1, wherein a reverse of the first power mode and the second power mode is to be implemented in response to one or more of a determination that one or more components of the apparatus is facing the user or is being used by the user.

12. The apparatus of claim 1, wherein a present power state of the apparatus is to be determined.

13. A method comprising:
determining a context corresponding to a user state; and
specifying a first power mode applicable to at least a part of a wearable apparatus and a second power mode applicable to at least a part of one or more computing platforms external to and associated with the apparatus based on the context, the first power mode causing a disruption to the part of the apparatus and the second power mode causing an activation to the part of the one or more computing platforms when the context indicates that action occurs via the one or more computing platforms.

14. The method of claim 13, further including one or more of:
processing sensor context data including one or more of orientation data, activity data, gesture data, feature data, attachment data, location data, or environmental data from one or more sensors;
processing database context data including one or more of social network data, electronic communication data, calendar data, or sensor data from one or more databases;
processing companion context data including one or more of platform data or link data indicating that the one or more computing platforms are associated with the apparatus; or
processing user context data including one or more of user setting data or user instruction data indicating a preference associated with the context.

15. The method of claim 13, wherein the first power mode causes an application of power only to the part of the apparatus and one or more of a relatively lower resolution at the part of the apparatus, a shutdown of a backlight to the part of the apparatus, a modification of one or more of a color, a contrast, or an intensity to the part of the apparatus, or a dimming to the part of the apparatus.

16. The method of claim 13, wherein the first power mode causes a relatively lower resolution at a part of a display screen facing the user when the context includes an exercise activity corresponding to a user travel motion.

17. The method of claim 13, wherein the first power mode causes an activation of at least one display screen of a plurality of opposing display screens facing the user and a deactivation of at least one display screen of the plurality of opposing display screens not facing the user.

18. The method of claim 13, wherein a reverse of the first power mode and the second power mode is implemented in response to one or more of a determination that one or more components of the apparatus is facing the user or is being used by the user.

19. The method of claim 13, further including determining a present power state of the apparatus.

20. At least one non-transitory computer-readable medium comprising one or more instructions that when executed on a computing device cause the computing device to:
determine a context corresponding to a user state; and
specify a first power mode applicable at least to a part of a wearable apparatus and a second power mode applicable to at least a part of one or more computing platforms external to and associated with the wearable apparatus based on the context, the first power mode to cause a disruption to the part of the apparatus and the second power mode to cause an activation to the art of the one or more computing platforms when the context is to indicate that action is to occur via the one or more computing platforms.

21. The at least one medium of claim 20, wherein when executed the one or more instructions cause the computing device to:
process sensor context data including one or more of orientation data, activity data, gesture data, feature data, attachment data, location data, or environmental data from one or more sensors;
process database context data including one or more of social network data, electronic communication data, calendar data, or sensor data from one or more databases;
process companion context data including one or more of platform data or link data indicating that the one or more computing platforms are associated with the apparatus; or
process user context data including one or more of user setting data or user instruction data indicating a preference associated with the context.

22. The at least one medium of claim 20, wherein the first power mode is to cause an application of power only to the part of the apparatus and one or more of a relatively lower resolution at the part of the apparatus, a shutdown of a backlight to the part of the apparatus, a modification of one or more of a color, a contrast, or an intensity to the part of the apparatus, or a dimming to the part of the apparatus.

23. The at least one medium of claim 20, wherein when executed the one or more instructions cause the computing device to implement a reverse of the first power mode and the second power mode in response to one or more of a determination that one or more components of the apparatus is facing the user or is being used by the user.

24. The at least one medium of claim 20, wherein when executed the one or more instructions cause the computing device to determine a present power state of the apparatus.

* * * * *